United States Patent [19]

Gilliam et al.

[11] Patent Number: 5,794,357
[45] Date of Patent: Aug. 18, 1998

[54] ONE PIECE COMPOUND LOCK FOR TAPE MEASURE

[75] Inventors: Edgar Thomas Gilliam, Franklinton; William Cecil Blackman, Raleigh, both of N.C.

[73] Assignee: Cooper Industries, Inc., Houston, Tex.

[21] Appl. No.: 904,352

[22] Filed: Jul. 31, 1997

[51] Int. Cl.⁶ .................................. G01B 3/10
[52] U.S. Cl. .................. 33/767; 242/385.4; 242/381.6
[58] Field of Search ................... 33/767; 242/396, 242/396.5, 396.7, 396.8, 381, 381.1, 381.3, 381.6, 385.4

[56] References Cited

U.S. PATENT DOCUMENTS

| | | | |
|---|---|---|---|
| 3,812,588 | 5/1974 | Bennett | 33/767 |
| 4,194,703 | 3/1980 | Roe | 33/767 |
| 4,903,912 | 2/1990 | Coughlin | 33/767 |
| 5,210,956 | 5/1993 | Knispel et al. | 33/767 |
| 5,400,521 | 3/1995 | Waldherr | 33/767 |
| 5,531,395 | 7/1996 | Hsu | 33/767 |
| 5,575,077 | 11/1996 | Jung Tae | 33/767 |

FOREIGN PATENT DOCUMENTS

| 531570 | 3/1993 | European Pat. Off. | 33/767 |
|---|---|---|---|

*Primary Examiner*—Thomas B. Will
*Attorney, Agent, or Firm*—Burns, Doane, Swecker & Mathis, L.L.P.

[57] ABSTRACT

A one-piece compound lock for a power return measuring tape includes an elongated lock member slidably mounted in a casing that engages both the tape blade and the tape drum to resist unwanted movement of the blade. The lock member has a resilient locking tongue and is slidably engaged in grooves in the casing to guide movement of the tongue between an unlocked and a locked position. Drum locking tabs extend laterally from lock member. In the locked position, the locking tongue applies locking pressure to the tape blade and the drum locking tabs engage the tape drum to resist rotation.

13 Claims, 2 Drawing Sheets

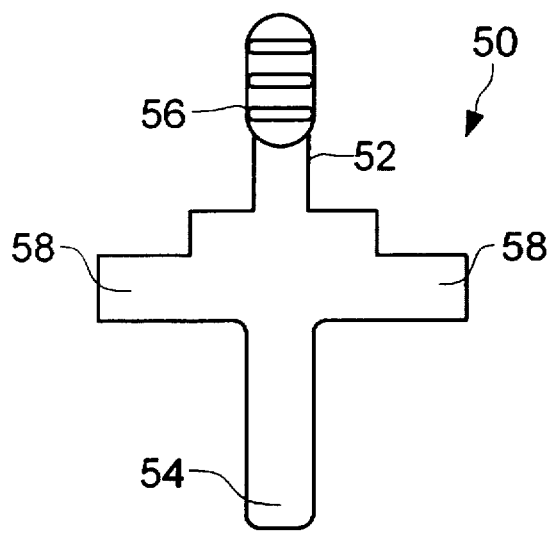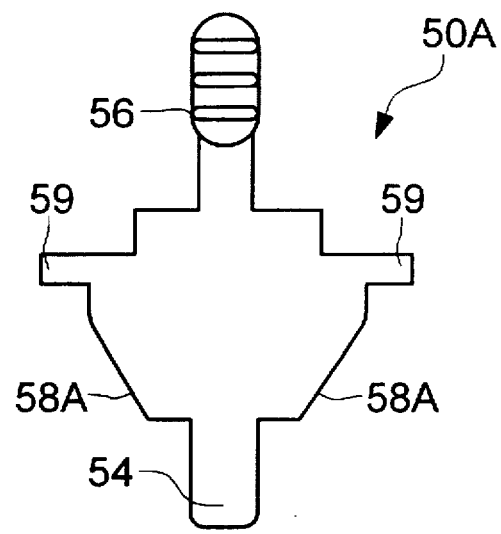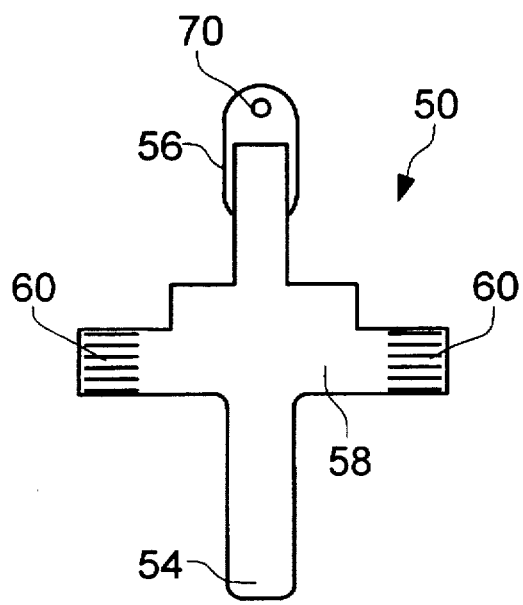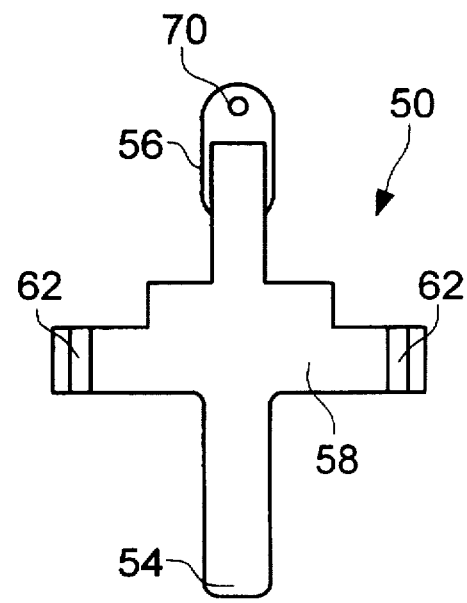

ONE PIECE COMPOUND LOCK FOR TAPE MEASURE

FIELD OF THE INVENTION

The invention is directed to retractable tape measures having power return mechanisms. More particularly, the invention is directed to a mechanism to lock the measuring tape blade in a position extended from a housing.

BACKGROUND AND SUMMARY

Power return tape measures typically include a mechanism to lock the measuring tape blade in a selected extended position. Known types of lock mechanisms include sliding and rocking devices. Conventional sliding lock mechanisms typically rely on friction between the lock member and the tape blade to resist movement of the tape blade, and thus maintain the blade in the selected position.

The invention provides an improved slide lock mechanism that applies locking action on both the tape blade and the drum on which the tape blade is wound. The lock according to the invention provides a more secure lock by simultaneously resisting rotation of the tape drum and movement of the blade.

A one-piece compound lock according to the invention includes an elongated lock member or body having a resilient locking tongue extending longitudinally from a lower end of the lock member, which engages the tape blade, and drum locking means formed on the body. The elongated lock member is movable between two positions, a locked position in which the tongue provides locking force to the tape blade against the bottom of the housing, and the drum locking means provides locking force to the drum to resist rotation of the drum. In an unlocked position, the tongue is spaced from the tape blade and the drum locking means is spaced from the drum, which permits rotation of the drum and movement of the tape blade from the housing, subject to a spring return mechanism.

According to the invention, a tape measure device includes a housing and a rotatable drum mounted within the housing. A tape blade is wound on the drum and is extendible through a mouth in the housing by pulling on the tape blade. A spring retracting device is mounted in the housing to bias the drum to retract the tape into the wound position.

According to another aspect of the invention, the housing includes guide means for guiding the elongated lock member between the locked and unlocked positions. According to a preferred embodiment, the guide means comprises grooves formed in the side walls of the housing in which laterally extending portions of the locking member are disposed for guided, sliding movement. The housing preferably has a D-shaped profile, and the guide grooves advantageously provide an arcuate path so that the lock mechanism can follow the profile of the housing and require a minimum of space in the housing.

According to another aspect of the invention, the lock member includes a finger pad for manually positioning the lock member. The finger pad is disposed on an outer surface of the housing and a rib-like projection extends through a slot in the housing to support the finger pad on the lock member.

According to yet another aspect of the invention, the lock member includes means for releasably securing the lock member in the locking position. In a preferred embodiment, the securing means comprises a detent projection on the lock member and a securing depression formed in the housing. In a particularly preferred embodiment, the projection is formed on a lower surface of the finger pad and the depression is formed on an outer surface of the housing.

According to the invention, the drum for the tape blade includes a cylindrical core and radially extending flanges on opposite ends of the core. The drum locking means comprises ears or tabs projecting laterally from the elongated body. In the locked position, the ears contact the radially outer edges of the flanges to apply the locking force. According to another aspect, the ears and the flange edges include serrations to increase friction between the ears and the edges. Alternatively, each arm has a slot that traps an edge of a flange when the lock member is in the locked position.

According to an alternative embodiment, the engaging means comprises wedge shaped projections formed on the elongated body. In the locking position, the wedge shaped projections move between the flanges and are wedged therebetween to exert locking force on the flanges.

BRIEF DESCRIPTION OF THE DRAWINGS

The invention may be understood by reference to the following description in conjunction with the appended drawings, in which:

FIG. 3 is a front view of a lock member according to the invention removed from the housing;

FIG. 4 is a front view of an alternative embodiment of the lock member in accordance with the invention;

FIG. 5 is a rear view of a lock member in accordance with the invention; and

FIG. 6 is a rear view of an alternative embodiment of the lock member.

DETAILED DESCRIPTION

Figure 1:
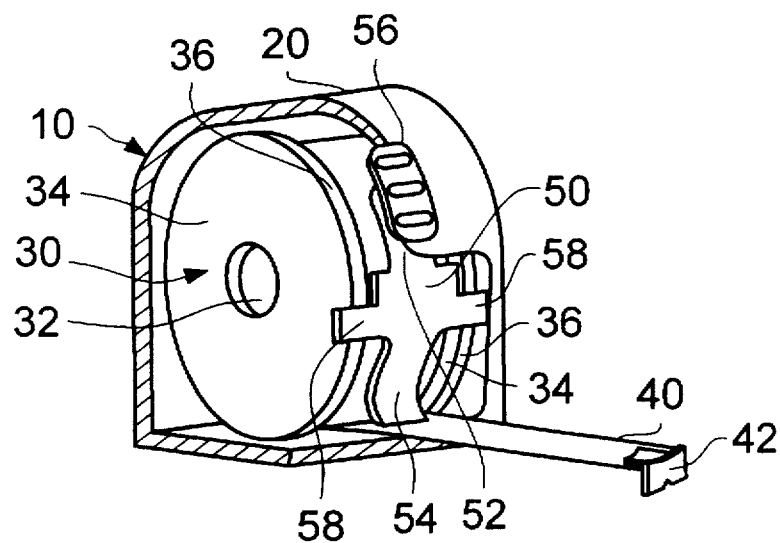
FIG. 1 is a perspective view of an illustrative measuring tape with a one-piece compound lock in accordance with the invention.
Figure 2:
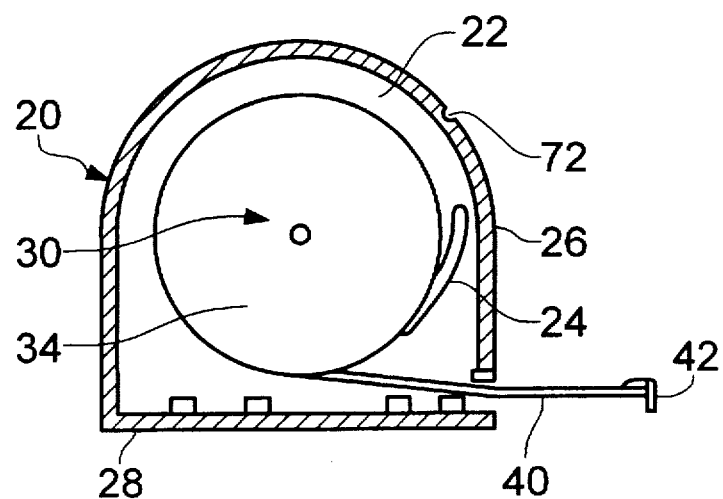
FIG. 2 is a section side view of the tape measure housing of FIG. 1.

A tape measure device 10 in accordance with the present invention includes a housing 20, a drum 30 rotatably mounted in the housing, and a measuring tape blade 40 wound on the drum. As illustrated in FIGS. 1 and 2, the housing has a D-shaped profile; however, the lock according to the invention can be used with housings of other shapes.

The drum 30 includes a core 32 and flanges 34 on opposite ends of the core. The tape blade 40 is wound on the core 32 between the flanges 34. The tape blade 40 has a leading end 42 that extends through a mouth 22 in the housing 20 by which the tape blade may be pulled from the housing for making measurements. The drum 30 includes spring retracting means (not illustrated) to rewind the tape blade onto the drum when the tape blade is released.

The tape measure device 10 also includes a one-piece compound lock 50 that acts on both the tape blade 40 and the drum 30 to resist movement of the tape blade. The compound lock 50 is reciprocally slidable between a locked position and an unlocked position. In FIG. 1, the compound lock 50 is shown in the locked position.

FIG. 2 shows a section view of the housing 20 from the left side, including the drum 30, but with the lock 50 removed. The side walls 22 of the housing include guide means for guiding the movement of the lock 50. In the embodiment illustrated in FIG. 2, the guide means comprises grooves 24 formed in the side walls 22. The grooves 24 engage laterally extending portions of the lock 50, as will be further described below.

Other guide means are possible. For example, a groove may be formed in the front wall 26 and a fin provided on the lock 50 to engage the groove.

The lock 50 is shown removed from the housing in FIG. 3. The lock 50 includes an elongated body member 52 having a resilient tongue 54 at a lower end of the lock. A finger pad 56 is formed on the elongated body 52 for manipulation of the lock. As seen in FIG. 1, the finger pad 56 is disposed on an outer surface of the housing 20. A rib extends through a slot in the housing to support the finger pad 56.

The grooves 24 define a path, as shown in FIG. 2, extending from the front wall 26 of the housing toward the drum 30 and toward the bottom wall 28. In the illustrated embodiment, the path of the grooves 24 is arcuate, which allows the lock member to follow the curvature of the housing and take up a minimal amount of space in the housing. As the lock 50 is moved toward the bottom wall 28, the grooves 24 cause the lock to move into contact with the drum 30 and the tape blade 40 on the bottom wall, which locks the tape blade and drum as further described below.

When the lock 50 is in the locked position, the tongue 54 presses the tape blade 40 against the bottom wall 28 of the housing 20. Friction between the tongue, tape blade and bottom wall resists movement of the tape blade.

The lock 50 also includes drum locking means to resist rotation of the drum when the lock is in the locked position. The drum locking means contacts the drum to apply a frictional force. In the embodiment of the invention illustrated in FIG. 1, the drum locking means is a pair of ears 58 that extend laterally from the elongated body 52. The ears 58 contact the radially facing edges 36 of the drum flanges 34 when the lock 50 is in the locked position.

In the illustrated embodiment, the ears 58 also engage the grooves 24 in the side walls 22 for guiding the movement of the lock 50. The grooves 24 also support the drum locking ears 58 in contact against the drum edges 36.

FIG. 4 illustrates an alternative embodiment of the lock. The lock 50a of FIG. 4 has drum locking means in the form of wedge-shaped wings 58a that project laterally from the elongated body 52. Tabs 59 extend from an upper end of the wings 58a and engage the guide grooves 22. The wedge-shaped wings 58a fit between the drum flanges 34, and movement of the lock 50 downward to the locked position forces the wider parts of the wings 58a into locking contact with the flanges.

FIG. 5 and FIG. 6 illustrate alternative embodiments of the reverse side of the lock of FIG. 3 according to another aspect of the invention. To increase the friction between the drum locking means and the drum flanges, the ears 50 are provided with friction increasing means. In FIG. 5, the ears 58 are formed with serrations 60 and similar serrations are formed on the edges 36 of the flanges 30. Contact between the serrated ears 58 and edges 36 produces improved locking force.

In FIG. 6, the ears 58 include slots 62 formed on the reverse side. The slots 62 have a width sufficient so that the flange edges 36 fit in the slots. When the lock 50 is in the locked position, the arms are moved downward and toward the flanges 34, which forces the edges 36 into the slots 62 to lock the drum.

The lock 50 includes means for releasably securing the lock in the locked position. According to one embodiment, the securing means includes a detent projection 70 formed on the finger tab 56, shown in FIGS. 5 and 6, and a mating recess 72 formed in the outer surface 26 of the housing on which the finger tab slides. Alternatively, the securing means may be a bump formed in the grooves 24 to capture the guide followers (the ears 58, for example) in a lower portion of the grooves, or another suitable means.

The invention has been described in terms of preferred principles and illustrative embodiments, however, the invention is not limited to the embodiments shown and described. Those skilled in the art will understand that substitutions and equivalents may be used without departing from the scope of the invention as defined in the following claims.

What is claimed is:

1. A one piece compound lock for a retractable tape measure, comprising:

a housing for a coiled measuring blade, the housing including opposing side walls, a bottom wall and a peripheral wall between the side walls, and having an opening between the bottom wall and the peripheral wall;

a tape blade drum rotatably mounted in the housing;

a tape blade wound on the blade drum, the tape blade reciprocally moveable through the opening;

a one piece lock member slidably mounted in the housing, the lock member having a longitudinal elongated body including a resilient tongue extending longitudinally from the body toward the bottom wall of the housing and a drum locking means;

wherein, the lock member is movable between a locked position with the tongue pressing the tape blade to the bottom wall and with the drum locking means in frictional contact with the drum, and an unlocked position with the tongue above the tape blade and with the drum locking means spaced from the drum.

2. The compound lock as claimed in claim 1, further comprising guide means formed in the housing to guide the sliding movement of the lock member.

3. The compound lock as claimed in claim 2, wherein the guiding means comprises grooves formed in the side walls of the housing and defining an arcuate guiding path, and wherein the elongated body includes lateral portions which are disposed in the grooves.

4. The compound lock as claimed in claim 1, wherein the lock member further comprises a finger pad for manually positioning the lock member.

5. The compound lock as claimed in claim 4, further comprising means for releasably securing the lock member in the locked position.

6. The compound lock as claimed in claim 5, wherein said means for releasably securing the lock member in the locking position comprises a detent projection on the lock member and a securing depression formed in the housing.

7. The compound lock as claimed in claim 1, wherein the drum includes flanges between which the tape blade is coiled, and wherein said drum locking means comprises ears projecting laterally from the elongated body to engage edges of the flanges, when the lock member is in the locked position.

8. The compound lock as claimed in claim 7, wherein lateral edges of the ears engage guide means in the housing for guiding movement of the locking member.

9. The compound lock as claimed in claim 8, wherein the side walls of the housing have grooves formed therein as said guide means.

10. The compound lock as claimed in claim 7, wherein contacting surfaces of the ears and the edges of the flanges each include serrations.

11. The compound lock as claimed in claim 7, wherein the ears include slots in which the edges of the flanges are captured when the lock member is in the locked position.

12. The compound lock as claimed in claim 1, wherein the drum includes flanges between which the tape blade is coiled, and wherein the locking means comprises wedge shaped projections formed on the elongated body, wherein the wedge shaped projections are forced between the flanges when the lock member is in the locked position.

13. The compound lock as claimed in claim 1, wherein the drum includes flanges between which the tape blade is coiled, and wherein the locking means comprises laterally projecting arms, each of said arms having a slot that traps an edge of one of said flanges when the lock member is in the locked position.

* * * * *